Jan. 2, 1962 F. G. ROHM 3,015,322
AIR INDUCTION SYSTEM FOR AN INTERNAL COMBUSTION ENGINE
Filed April 18, 1960 3 Sheets-Sheet 2
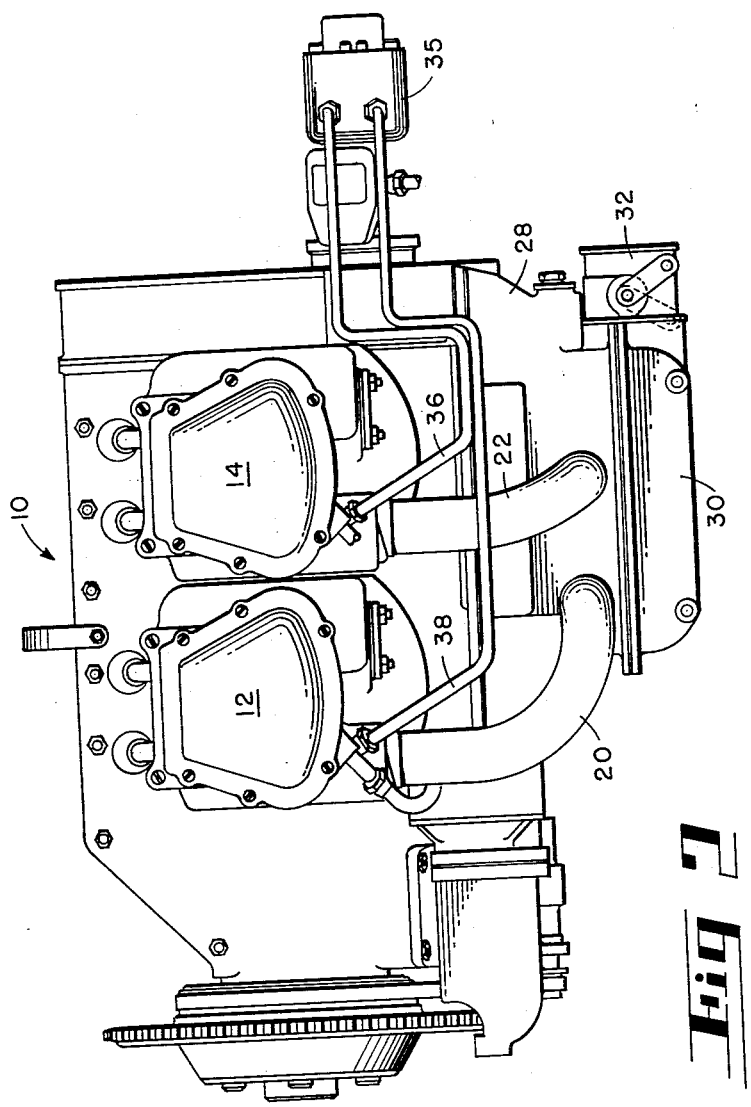
INVENTOR.
FREDRIC G. ROHM.
BY
ATTORNEYS.

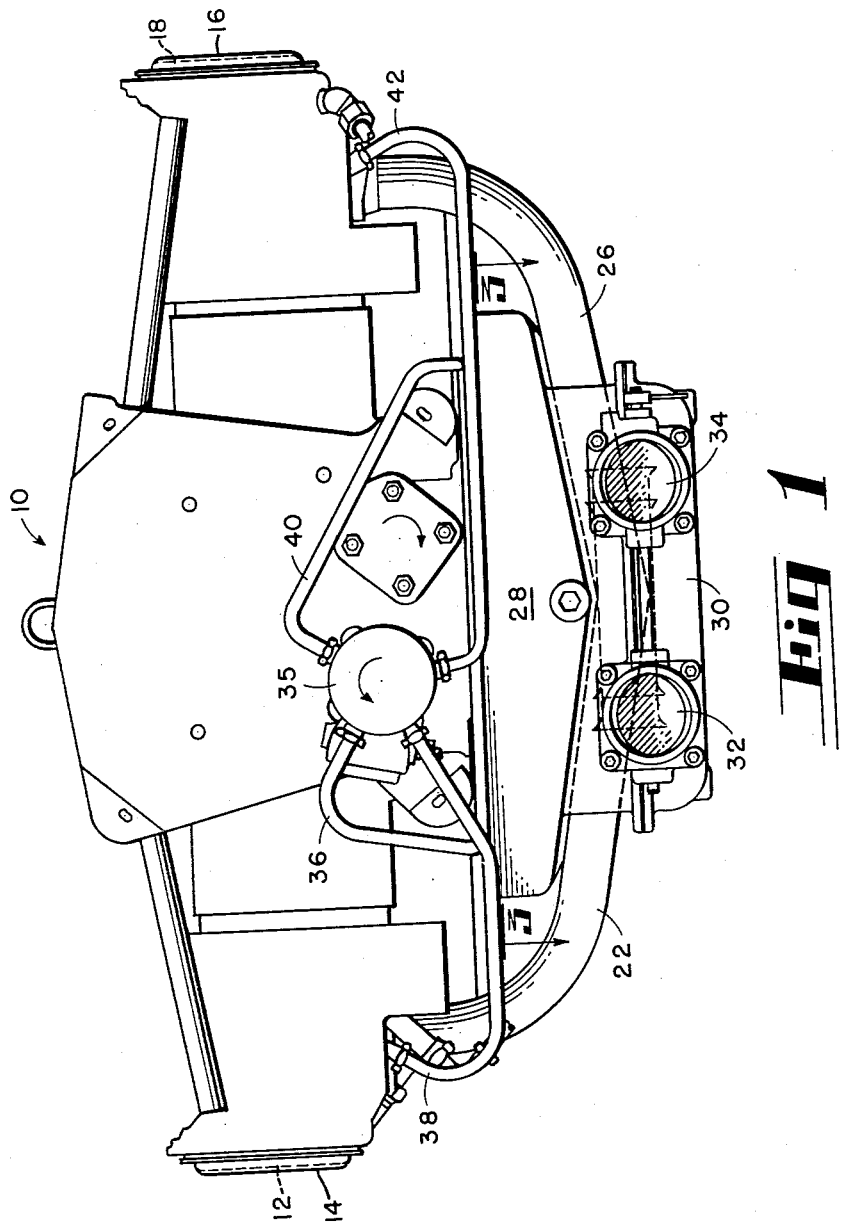

Jan. 2, 1962 F. G. ROHM 3,015,322
AIR INDUCTION SYSTEM FOR AN INTERNAL COMBUSTION ENGINE
Filed April 18, 1960 3 Sheets-Sheet 3

INVENTOR.
FREDRIC G. ROHM.
BY
ATTORNEYS.

United States Patent Office 3,015,322
Patented Jan. 2, 1962

---

3,015,322
AIR INDUCTION SYSTEM FOR AN INTERNAL COMBUSTION ENGINE
Fredric G. Rohm, Lycoming County, Pa., assignor to Avco Corporation, Williamsport, Pa., a corporation of Delaware
Filed Apr. 18, 1960, Ser. No. 22,917
3 Claims. (Cl. 123—32)

This invention relates to an air induction system for an internal combustion engine.

The power and engine can deliver is dependent upon the amount of air (oxygen) available to burn the fuel. With a normally aspirated, piston type engine, air is drawn or "sucked" into the cylinder past the open inlet valve into the space being vacated by the piston as it travels to the bottom of its stroke. The amount of air thus drawn into the cylinder is a function of the ambient air pressure available to "push" the air into the cylinder. If pressure (supercharger) is applied to the air being introduced to the cylinder, more air by weight would enter the cylinder during a given piston stroke. Fuel in the proper amount can be introduced into the cylinder or cylinders by a number of means.

The invention here considered relates to means to introduce more air to the cylinders without the necessity of superchargers as such.

The air induction system of this invention utlizes the kinetic energy of a moving column of air to provide an increase in air flow. As the forward end of a moving column of air (in the air inlet pipe to an engine cylinder) is stopped by closing the inlet valve to the cylinder, the inertia of this mass of air tends to keep it in oscillatory motion, periodically compressing itself in the end of the pipe thus closed by the inlet valve. If the inlet valve is then opened at the correct time, this pressure effect forces a greater weight of air into the cylinder than would have entered otherwise. This effect has been called inertia supercharging.

It has been established theoretically and experimentally that various pipe lengths are effective in producing engine supercharging. While the principle involved can apply to any piston engine, the opposed cylinder arrangement of light aircraft engines is particularly suited to accommodate the necessary pipe size, etc., in a configuration desirable for aircraft installation.

The improvement in engine performance made possible by proper selection of intake pipe length to improve the volumetric efficiency of an internal combustion engine has been generally known in the art, and various structures to accomplish this purpose have been developed.

It is a primary object of the present invention to provide an improved structure, whereby the advantages of inertia supercharging may be realized to a greater extent and with better adaptation to the reciprocating engine for aircraft use.

By determination of a proper length of intake pipe, the pressure wave pulsation and its largest magnitude is made to coincide with the opening of the intake valve so that such maximum of the pressure wave is used to increase the density of the air entering the engine, thereby attaining a measure of supercharging and an increase in power output. This result is accomplished by providing a pipe of such length that the pressure wave peaks in proper relation to the opening of the inlet valve. There are a plurality of pipe lengths and pipe diameters satisfactory to satisfy the conditions of optimum advantage.

It is a further feature of this invention that the selection of arrangement and general relative location of the inlet pipes and the means of admitting air thereto, is such that a selection of lengths of pipe may be made from a group of possible advantageous lengths which will fit into the arrangement, accomplishing the result of an engine adapted in shape and arrangement for an aircraft power plant installation and the proper satisfactory operation of the intake system in such an engine.

More specifically, it is an object of the invention to provide an air intake system, employing a plurality of individual intake pipes of defined size as to cross section and length suitable for optimum performance, and to arrange such pipes in a relationship with the engine profile and general shape of an aircraft engine installation with housing for such pipes useful both as a fairing for enclosing the pipes and also affording a means of throttling air into the intake system, all of such features acting in cooperative relationship to afford an efficient intake system suitable for both optimum engine performance and to the power plant installation requirements of the aircraft.

It is a further object in a modified form of this invention to provide intake pipe lengths for the various cylinders in the engine to provide optimum performance advantage at various r.p.m. values, thereby providing an overall increase in efficiency of the engine over a greater range of r.p.m. than would be achieved with all inlet pipes the same length for all cylinders, this advantage at a slight sacrifice of performance for any one speed.

The above and other objects of the invention will appear more fully from the following more detailed description and by reference to the accompanying drawings forming a part hereof and wherein:

FIGURE 1 is an end view of an engine of the opposed cylinder horizontal type showing the inlet pipes and the chamber into which the end pipes extend, and also of the throttle valves admitting air to the chamber.

FIGURE 2 is a side view of this engine, also showing the inlet pipes and the chamber, together with the throttle valves for the inlet.

FIGURE 3 is a section substantially on the lines 3—3 of FIG. 1 and shows inlet pipes, interior of the chamber, and the arrangement of the pipes and the side-by-side relationship therein.

Figure 7:
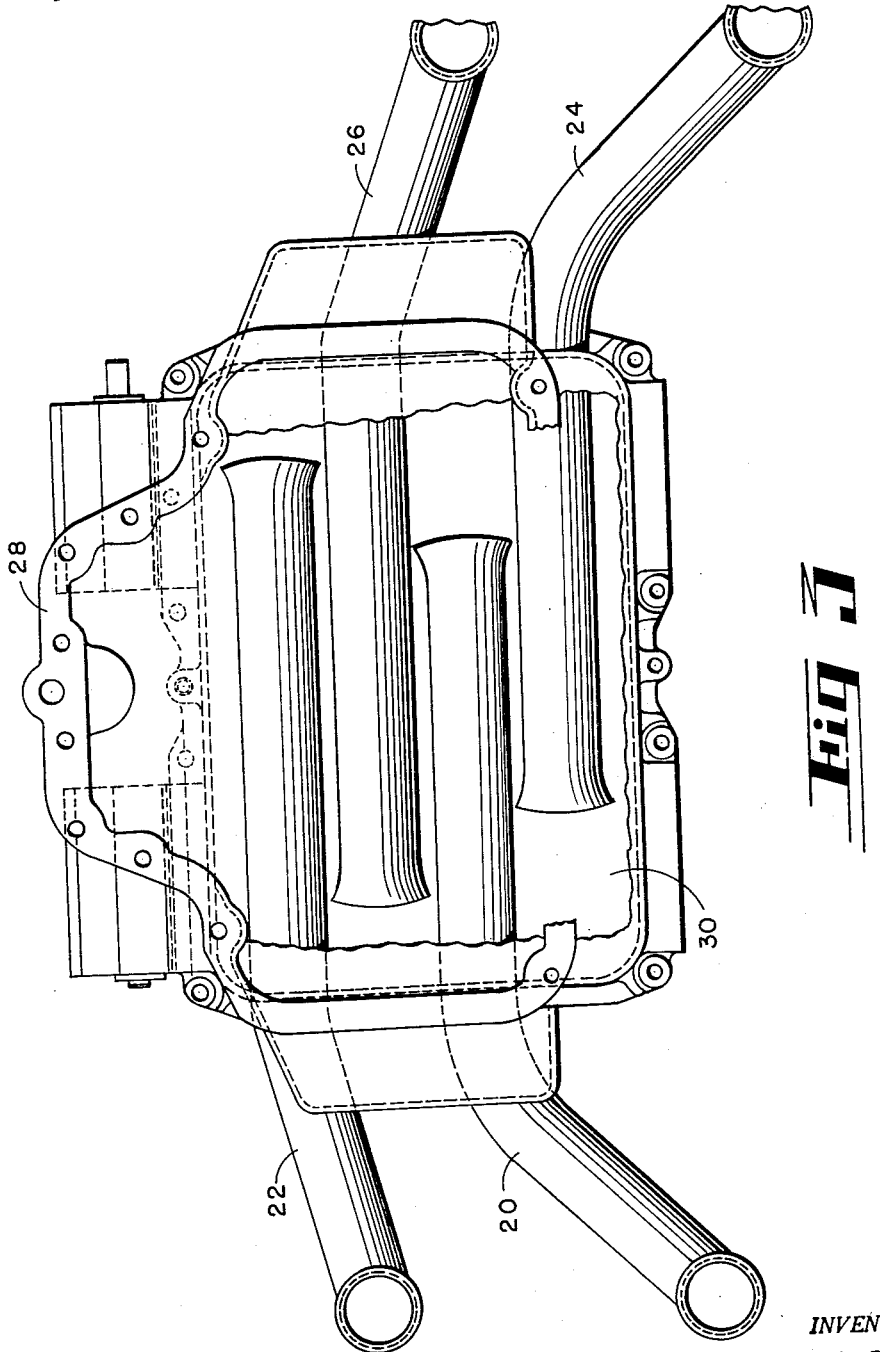

Referring to the drawings:

FIGS. 1 and 2 show a four-cylinder horizontally opposed reciprocating internal combustion engine 10, with cylinders 12, 14 in one bank and cylinders 16, 18 in the opposite bank. Each of the cylinders 12, 14, as well as the cylinders 16, 18, has an inlet pipe for feeding air to the individual cylinder, these intake pipes being numbered 20, 22 for the cylinders 12, 14 and 24, 26 for the cylinders 16, 18. Formed integrally with the oil sump 28 of the engine, there is a generally rectangular shaped air chamber 30 formed beneath the oil sump 28 and closely paralleling the same. This air chamber is of limited depth—that is, in thickness, as shown—however, it is slightly greater in depth than the diameter of the individual intake pipes 20, 22, 24, 26. These intake pipes extend into the chamber from openings at the side thereof, and as shown in FIG. 3, each of the intake pipes extends beyond the center line of the engine into the chamber. This arrangement is seen in FIG. 3, where it appears that the intake pipes 20, 22 extend beyond the center line of the engine to the opposite side of the chamber, while the intake pipes 24, 26 also extend beyond the center line of the engine in the opposite direction, so that the openings in the pipes are staggered, as shown, but that the four pipes are arranged in substantially the same plane in the chamber, although they are inclined at a slight angle as shown in FIG. 1.

The four pipes, as shown in FIG. 3, are substantially parallel to each other and extend along and inside the chamber 30 and occupy a major portion of said chamber with, however, a distance in each case between the end of the individual pipes and the edge of the chamber. It is thus made possible by this arrangement to carry the pipes from their individual cylinders downwardly and inwardly into the inlet chamber so that there is a relatively short length of pipe outside and the pipes are completely enclosed in the chamber 30 at their ends and are so arranged as to draw air from the interior of the chamber 30.

Chamber 30 is also provided with two air inlet throttle valves 32, 34. The valves control the inlet of air to the chamber 30.

The type of fuel injection for the engine here disclosed is provided by the fuel injector 35, which has individual fuel lines 36, 38, 40 and 42, which carries fuel to the four individual cylinders 12, 14, 16, 18. This type of fuel injector is well known in the art, and by such means it is possible to inject fuel individually to each cylinder. However, the air for mixing with this fuel is furnished through the intake pipes 20, 22, 24, 26 from the chamber 30 controlled by the throttle valves 32 and 34. Thus, there is accomplished a flow of both air and fuel to the individual cylinders, and the air being carried from the inlet throttle valves 32 and 34 into the chamber and thence into the ends of the individual intake pipes 20, 22, 24, 26 without fuel being intermingled therewith, thereby avoiding the difficulty which would be apparent if a carburetor were attached. Also, if a mixture of fuel and air were injected into the chamber 30, tubulence would result in a precipitation of the fuel from the air due to the irregular flow and would present many problems which are obviated by the arrangement herein shown.

The arrangement of the pipes as shown, terminating in a staggered group of intake pipes with their inlet ends substantially in the same plane, makes it possible to provide a chamber 30 of thickness only slightly greater than the diameter of the pipes, including additional height necessary for the slight incline of the pipes from the cylinder. Essentially, however, the thickness of the chamber is determined by the parallel grouping of the intake pipes in a substantially rectangular pattern nearly in the same plane under the engine.

With the general arrangement of air intake pipes for the several cylinders of the horizontally opposed engine of the type here used for illustration, it then becomes important to determine the several lengths of intake pipe which will accomplish the result desired, and, as previously indicated, there will be several possible lengths, but one such length must be selected in order that the increased efficiency from inertia supercharging will be available and the means for the computation of such lengths is accomplished as follows:

During the suction stroke, air is moving with substantial velocity through the intake pipe. After the suction stroke, rising of the piston and closing of the intake valve brings the air velocity to zero at the inner end of the pipe, that is, at the intake valve. Because of the compressibility and inertia of the air, its motion in the rest of the pipe is not immediately arrested but continues for a time, which has been found to be one quarter of the fundamental period of the subsequent oscillations of the air in the pipe. At this time, because all of the air has been brought to rest, its kinetic energy has been transformed to potential energy and the air density at the intake valve is a maximum. Since the pressure in the pipe is now unevenly distributed, oscillations begin at the fundamental frequency of the system with slowly decaying amplitudes. This oscillation results in pressure peaks occurring at the inlet valve end of the inlet pipe. The approximate fundamental frequency of a tube closed at one end is $$Y = \frac{12C}{4L}$$

where "L" is the length in inches and "C" is the speed of sound in the air in feet per second.

For the desired increase in volumetric efficiency, it has been found, experimentally, that a pressure peak should be made to occur at the midpoint of the overlap period between the inlet valve opening and the exhaust valve closing. This is fixed by the valve timing for a specific engine configuration. Also, it has been shown, both theoretically and experimentally, that forced oscillation in the inlet tube starts near or at the bottom of the piston travel. The duration of the oscillation in crank degrees is called $\theta$. Typically, the value of $\theta$ is 540° for one cam timing design. The corresponding time interval (T) for $\theta$ degrees of crank movement is:

$$T = \frac{\theta}{360} \times \frac{60}{N} = \frac{\theta}{6N} \text{ seconds}$$

where "N" is in revolutions per minute.

The number of desired oscillations of the air column during $\theta$ degrees of crank movement is $n + .25$, where "$n$" is an integer. The constant .25 represents the wave formed between the application of excitation and the first pressure peak (one quarter cycle positive). "T" also may be expressed by $$T = \frac{L}{3C}(n + .25)$$

Therefore $$T = \frac{L}{3C}(n + .25) = \frac{\theta}{6N}$$

or, $$L = \frac{C\theta}{2N(n + .25)}$$

Integer values of "$n$" in this expression give the several lengths of intake pipe which will give the desired action. For example:

$N = 3200$ r.p.m.
$\theta = 540°$
$C = 1078$ f.p.s. corresponding to 23° F.

Then:

| n | L, inches |
|---|---|
| 0 | 364 |
| 1 | 72.8 |
| 2 | 40.4 |
| 3 | 28.0 |
| 4 | 21.4 |
| 5 | 17.3 |

These are some of the allowable lengths of intake pipes for the specified conditions. The length is measured from the intake face to the outer end of the intake pipe.

With the several possible lengths of intake pipes computed as above, the length of pipe selected in such as will fit in the general engine arrangement, keeping in mind that the realization of full advantages of inertia supercharging relies on maintaining the acoustical length of the pipe without changing the properties as to such acoustics from that which would result if the pipe were extending with a free end open to the atmosphere. It must be understood that the engine arrangement, as combined with the intake pipes of computed length for optimum inertia supercharging, is very important. For instance, with a common air inlet chamber surrounding the ends of the pipes, the closely adjacent positioning of the ends of the individual pipes or the close positioning of the ends of the pipes to a wall, might have a detrimental effect on the acoustical property of the pipe and might well destroy the tuned frequency which the carefully selected length of the pipe would otherwise assure. In general, the requirement is that the pipe should take in air at its open end of defined length from a chamber relatively free of obstructions at the open end. Thus, if the ends of pipe are connected to a common air inlet box or chamber, said chamber must be of sufficient size and sufficient air inlet capacity thereto to supply the end of the pipes with air during operation without interfering with the acoustical properties of the pipe. It is also important that the ends of the pipe be spaced from each other a sufficient amount so that there is no acoustical interference between the pipes, and furthermore that such pipes should be spaced from the adjacent wall of the chamber a sufficient distance such that the acoustical properties of the pipe is not materially disturbed.

All of the above requirements are generally designated as such relative arrangement of the pipes as to prevent acoustical interference of the pipes by adjacent surroundings at the ends thereof. The specific selection of pipe lengths, from the above listed lengths for the design as shown in the drawings, was selected as 21.4 inches, and the pipes are arranged in side-by-side staggered relationship, as heretofore described, with their ends extending beyond the center line of the engine and so related to each other that there is a pipe intervening between any two pipe ends and the ends of the pipe, as shown in the plan view FIG. 3, are shown as spaced away from the wall of the chamber a distance greater than the diameter of the pipes.

The selection of pipes all of the same length not only gives the most advantageous increase in performance for any one selected engine speed, but also improves the performance over a range of speeds. It is possible by a modified form of the present invention to gain advantage of inertia supercharging over an even wider range of speeds by selecting pipes of various lengths for the various cylinders, this being accomplished by using different lengths, perhaps on each cylinder, each of which is designed for the optimum advantage for a different speed. The result will be an increase in performance for the composite grouping of cylinders, which for any one speed will be a little less than the optimum obtained when all pipe lengths were selected for one speed, but will spread a lesser increase over a greater speed range.

It is intended that the general principles herein disclosed might be used in still other arrangements of air intake systems for internal combustion engines by selecting different lengths from the group of possibilities which would fit such other arrangements. It is therefore contemplated that such modifications may be made within the scope of the following claims.

I claim:

1. In an air induction system for a reciprocating internal combustion engine having opposed banks of cylinders, inlet pipes for feeding air to said cylinders extending from the cylinders under the engine past the center line of the engine and staggered and overlapping in a substantially horizontal position, a container for covering the overlapping section and inlet portions of said pipes extending in a substantially horizontal position underneath the engine, an inlet including a throttle valve therefor for controlling the inlet of air to said container and said inlet pipes, and separate fuel injection means for injecting fuel individually to said cylinders, each inlet pipe length in inches being $$\frac{C\theta}{2N(n+.25)}$$

where C is the velocity of sound in air in an inlet pipe, $\theta$ is the degrees after bottom dead center at the end of the previous intake stroke, and N is revolutions per minute of the engine at which optimum power advantages are desired, and $n$ is any number giving a length on computation best suited to the engine arrangement.

2. In a multiple-cylinder internal combustion engine air inlet system of the type employing one inlet pipe for each cylinder, with the engine cylinder inlet valve for each cylinder operating in timed relation with engine crankshaft rotation and controlling communication between each pipe and its corresponding cylinder, the length of each inlet pipe being $$\frac{C\theta}{2N(n+.25)}$$

where C is the velocity of sound in air in an inlet pipe, $\theta$ is the degrees after bottom dead center at the end of the previous intake stroke, and N is revolutions per minute of the engine at which optimum power advantages are desired, and $n$ is any number giving a length on computation best suited to the engine arrangement.

3. In a multiple-cylinder internal combustion engine air inlet system of the type employing one inlet pipe for each cylinder, with the engine cylinder inlet valve for each cylinder operating in timed relation with engine crankshaft rotation and controlling communication between each pipe and its corresponding cylinder, the length of each inlet pipe being $$\frac{C\theta}{2N(n+.25)}$$

where C is the velocity of sound in air in an inlet pipe, $\theta$ is the degrees after bottom dead center at the end of the previous intake stroke, and N is revolutions per minute of the engine at which optimum power advantages are desired, and $n$ is any number giving a length on computation best suited to the engine arrangement, the value of N in revolutions per minute of the engine for determining length of certain of said inlet pipes being set at a value for optimum power advantage different from others of said pipes thereby to gain a power advantage for the engine over a range of the said value of N.

References Cited in the file of this patent

UNITED STATES PATENTS

| 2,119,879 | Hoffman et al. | June 7, 1938 |
| 2,791,205 | Platner et al. | May 7, 1957 |
| 2,801,620 | Goodridge | Aug. 6, 1957 |
| 2,845,911 | Gill | Aug. 5, 1958 |
| 2,857,893 | Lobdell | Oct. 28, 1958 |
| 2,894,497 | Bolles | July 14, 1959 |
| 2,909,165 | Dolza | Oct. 20, 1959 |
| 2,915,049 | Armstrong et al. | Dec. 1, 1959 |
| 2,916,027 | Chayne et al. | Dec. 8, 1959 |

OTHER REFERENCES

"Inertia Supercharging of Engine Cylinders," Trans. A.S.M.E., vol. 55, No. 5, 1933, pages 53–64, Dennison.

"Effect of Intake Pipe on the Volumetric Efficiency of an Internal Combustion Engine," N.A.C.A., T.M. No. 501, February, 1929, pages 4–6, Capetti.

"Dynamics of the Inlet System of a Four-Stroke Engine," N.A.C.A., T.N. 935, 1944, page 2, Boden.